US007874431B2

(12) United States Patent
Eisengraeber-Pabst et al.

(10) Patent No.: US 7,874,431 B2
(45) Date of Patent: Jan. 25, 2011

(54) FILTER ELEMENT FOR CLEANING A FLUID

(75) Inventors: Jobst Eisengraeber-Pabst, Benningen a.N. (DE); Joachim-Paul Krieger, Reisbach (DE); Alfons Schwinghammer, Dingolfing (DE); Johannes Lampert, Remseck (DE); Daniela Knodel, Sersheim (DE); Frank Pflueger, Sachsenheim (DE); Fritz Kupfer, Poxau (DE)

(73) Assignee: Mann + Hummel GmbH, Ludwigsburg (DE)

( * ) Notice: Subject to any disclaimer, the term of this patent is extended or adjusted under 35 U.S.C. 154(b) by 0 days.

(21) Appl. No.: 11/754,501

(22) Filed: May 29, 2007

(65) Prior Publication Data

US 2007/0277488 A1    Dec. 6, 2007

(30) Foreign Application Priority Data

May 29, 2006    (DE) .................. 20 2006 008 596 U

(51) Int. Cl.
*B01D 27/06* (2006.01)
*B01D 29/07* (2006.01)
*B01D 27/00* (2006.01)
*B01D 29/00* (2006.01)
*B01D 39/00* (2006.01)

(52) U.S. Cl. .............. 210/493.1; 210/497.1; 210/493.5; 210/497.01; 55/521

(58) Field of Classification Search .................. None
See application file for complete search history.

(56) References Cited

U.S. PATENT DOCUMENTS

| 4,046,697 | A | * | 9/1977 | Briggs et al. ................. 210/457 |
| 4,402,830 | A | * | 9/1983 | Pall ............................. 210/457 |
| 4,652,285 | A | * | 3/1987 | Greene .................... 210/493.1 |
| 5,039,413 | A | * | 8/1991 | Harwood et al. ............. 210/457 |
| 5,152,892 | A | * | 10/1992 | Chambers ................ 210/493.4 |
| 5,792,353 | A | * | 8/1998 | Jungi et al. .................. 210/350 |
| 5,938,925 | A | * | 8/1999 | Hamid et al. ............. 210/497.1 |
| 6,102,978 | A | * | 8/2000 | Butler ......................... 55/492 |
| 6,103,119 | A | * | 8/2000 | Clements et al. ......... 210/493.1 |
| 6,911,144 | B2 | * | 6/2005 | Van Pelt et al. ............. 210/232 |
| 2009/0200228 | A1 | * | 8/2009 | Eisengraber-Pabst et al. .... 210/493.5 |

FOREIGN PATENT DOCUMENTS

| DE | 102 44 925 A1 | 4/2004 |
| GB | 2 020 995 A | 11/1979 |
| WO | WO 2007/012588 A2 | 2/2007 |

OTHER PUBLICATIONS

European Search Report dated Sep. 20, 2007 (Seven (7) pages).

\* cited by examiner

*Primary Examiner*—Krishnan S Menon
*Assistant Examiner*—Madeline Gonzalez

(57) ABSTRACT

A filter element for cleaning a fluid having a pleated filter medium designed for radial flow, to the outside of which a circumferential reinforcing thread is applied. The outside of the filter medium is divided into two axial sections, to which the reinforcing thread is applied in a plurality of circumferential thread windings, such that the axial distance between directly adjacent thread windings differs in the two sections.

13 Claims, 2 Drawing Sheets

FILTER ELEMENT FOR CLEANING A FLUID

BACKGROUND OF THE INVENTION

The invention relates to a filter element for cleaning a fluid having a reinforced, pleated filter medium designed for radial flow.

German Utility Model No. DE 20 2004 003 326 U1 discloses a filter element for cleaning a fluid, which is formed as a hollow cylinder and comprises a pleated filter medium on a support grid, such that the fluid to be cleaned flows radially through the filter medium. Conventionally, the fluid flows radially from the outside into such filters, and the interior represents the clean side, through which the filtered fluid is discharged in axial direction. The end faces of the filter medium are sealed by cover disks, which axially terminate the filter medium in a liquid tight manner and stabilize and stiffen the filter element.

As a rule, the pleated and annularly disposed filter medium is formed of a nonwoven or paper material, i.e., a material that has relatively little inherent stability, so that a support member is provided on the radial inside of the filter medium to increase stability. In DE 20 2004 003 326 U1, a circumferentially extending, helically wound thread is glued to the outside and further stabilizes the folds of the filter medium particularly in circumferential direction. This reinforcing thread extends on the peripheral side between the two axial end disks of the filter element.

The relatively soft and unstable material of the filter medium has other disadvantages as well. To mount or clean the filter element, an operator must grasp it, which involves the risk that pressure marks with radially pressed in folds or circumferential shifts of the filter folds occur at the peaks of the folds. To prevent this, the filter element must either be grasped very carefully or grip protection means must be applied to the outer lateral surface, thereby increasing the structural complexity, however.

SUMMARY OF THE INVENTION

It is an object of the present invention to provide a improved filter element for cleaning a fluid flow having a pleated filter element designed for radial flow.

Another object of the invention is to provide a radial flow, pleated filter element in which the stability of the filter element is improved by simple structural measures.

These and other objects are achieved in accordance with the present invention by providing a filter element for cleaning a fluid, having a pleated filter medium designed for radial flow and having a reinforcing thread circumferentially applied to the outside of the filter medium, wherein at least two axial sections are provided on the outside of the filter medium, in which the reinforcing thread is applied to the outside in a plurality of axially spaced circumferential thread windings, and wherein directly adjacent thread windings in one axial section are spaced apart an axial distance which differs from the axial spacing of adjacent thread windings in the other axial section.

Advantageous refinements and preferred embodiments are described hereinafter.

The filter element according to the invention has a reinforcing thread applied to the peaks of the folds of the filter medium or filter means in a plurality of circumferential thread windings such that, as seen in axial direction of the filter element, a plurality of adjacent spaced-apart thread windings or tracks are placed around the filter medium. The outside of the filter medium is axially divided into two or more sections, and the thread windings in these sections differ in their axial spacing in relation to each other. For example, if the filter medium is divided into two sections, the thread winding is more closely spaced in the first section of the filter medium and more widely spaced in the second section. The section with the more widely spaced thread winding serves as a stabilizing zone, whereas the closely spaced thread winding functions as a grip protection. Despite the relatively closely spaced winding, adequate flow of the fluid being cleaned through the filter medium is ensured.

The second section with the axially greater spacing of the thread winding has primarily a stabilizing function and acts only secondarily as a grip protection. Due to the greater distance between adjacent thread windings, the reinforcing thread offers practically no flow resistance to the fluid to be filtered, which flows radially through the filter medium.

The reinforcing thread can be applied and firmly connected to the pleated side of the filter medium in a mechanically simple manner, e.g., by bonding. Stabilization and reinforcement are effected both in circumferential direction of the filter medium and in axial and radial direction. Bonding has the advantage that a firm connection is created at all the points of contact between the reinforcing thread and the outer lateral surface of the filter medium. In some cases it may even be sufficient to provide a firm connection over only a portion of the contact points or, according to an alternative embodiment, to eliminate bonding altogether and create an immovable firm connection between the thread and the filter medium based solely on the inherent tension with which the reinforcing thread is wound around the filter medium and the resulting slight radial constriction of the filter medium by the thread.

Preferably a single continuous reinforcing thread is provided, which extends helically over the individual sections. In this embodiment, the reinforcing thread winds helically around the outside of the filter medium over the axial length of the two sections. As an alternative, it is possible to provide two separate reinforcing threads, with one extending helically around the outside of each section. What is essential in both cases is that the thread pitch of the helically applied reinforcing thread differs in the two sections.

In accordance with yet another embodiment, the reinforcing thread does not extend helically, but a plurality of separate threads is provided, which run in circular paths along the outside of the filter medium, each circular path lying concentric to and at a distance from the next circular path. The axial distance between adjacent circular paths differs in the two sections. In another alternative embodiment, a helical winding is used on one of the two sections and a circular path winding on the other section, such that the helical thread winding is preferably provided in the section serving as a grip protection zone.

It has been found to be advantageous if the distance between adjacent thread windings in the two axial sections on the outside of the filter medium differs by a factor of 1.5 to 10, so that the winding in the first axial section, which corresponds to the grip protection zone, is denser by a factor of 1.5 to 10 and the axial distance between directly adjacent thread paths is correspondingly reduced. Within this range of values, a factor of 3 has been found particularly advantageous. Expressed in absolute numbers, the axial distance between adjacent thread windings within the first section is, for example, 3 to 15 mm, particularly 8 mm, and in the second axial section 10 to 60 mm, particularly 25 mm.

BRIEF DESCRIPTION OF THE DRAWINGS

The invention will be described in further detail hereinafter with reference to illustrative preferred embodiments shown in the accompanying drawing figures, in which.

DETAILED DESCRIPTION OF PREFERRED EMBODIMENTS

Figure 1:
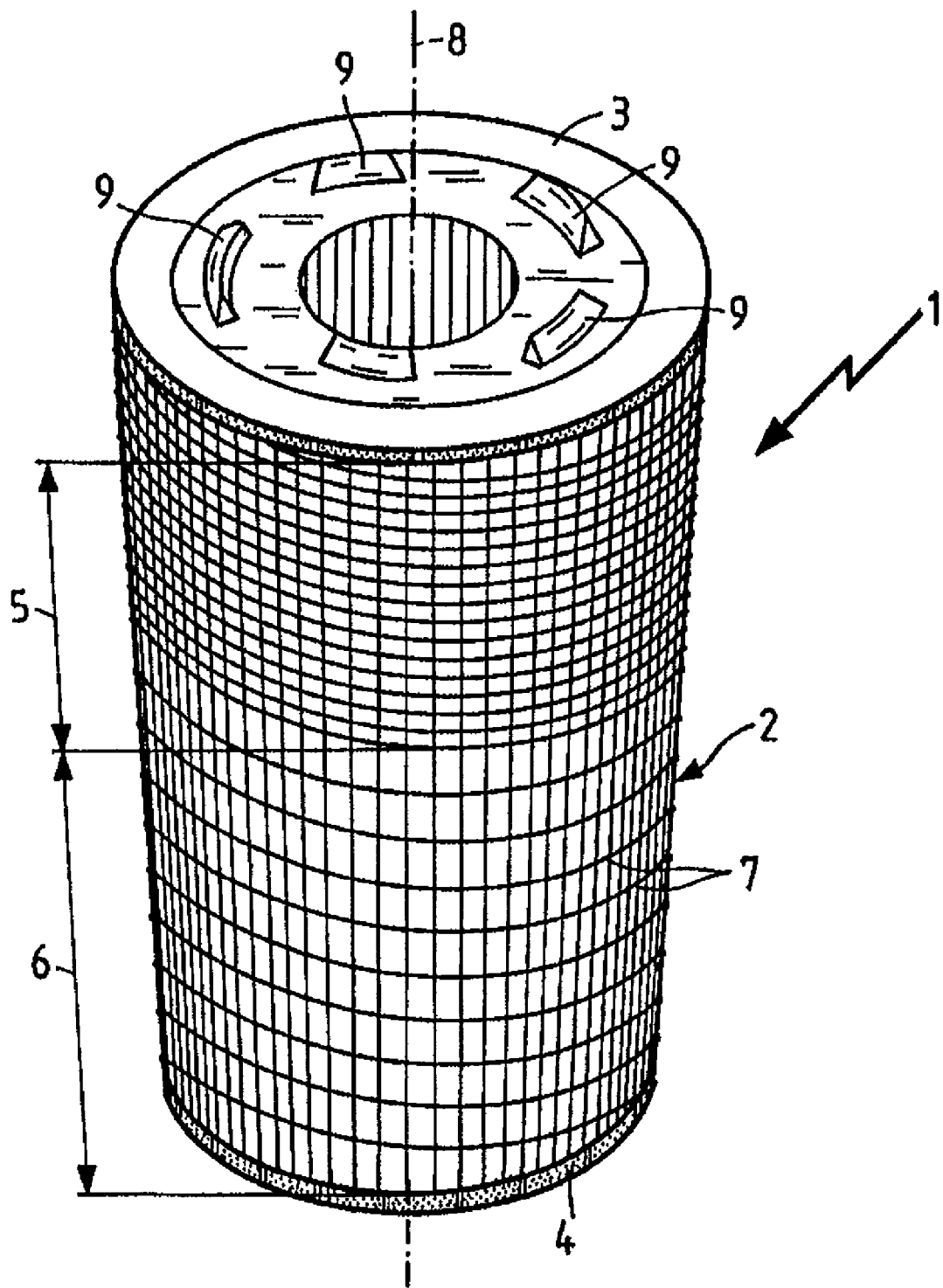
FIG. 1 is a perspective view of a cylindrical filter element for cleaning a fluid, having a filter medium configured as a pleated filter through which the fluid flows in radial direction, and having a reinforcing thread bonded helically to the outside of the filter medium.

The filter medium 1 depicted in FIG. 1 is used for fluid filtering, e.g., air filtering, particularly for filtering the engine intake air or for filtering liquids in motor vehicles, particularly as an oil filter or a fuel filter. The filter element 1 comprises a filter medium 2, which is configured as a hollow cylinder and is comprised of a pleated filter paper or a nonwoven filter web. The filter medium 2 receives flow radially from the outside—the outside representing the unfiltered fluid side of the filter—with the filtered fluid being discharged axially through the interior, i.e., the filtered fluid side. The folds of the filter medium 2 extend in radial direction. Axially, the filter element 1 is terminated on each of its two end faces by an end disk 3 or 4. The filter element 1 is part of a filter apparatus, which is preferably used in motor vehicles. As indicated on the upper end disk 3, fastening or latching means 9 may be provided on the end disks to safely and firmly anchor the filter element 1 in the filter device provided therefor.

A helical circumferential continuous reinforcing thread 7 is bonded to the filter peaks of the pleated filter medium 2 and extends axially between the two end disks 3 and 4. The outside of the filter medium 2 can be divided into two axial sections 5 and 6. The first section adjoining the upper cover disk 3 has the function of a grip protection zone. Within this first section 5, the helically wound reinforcing thread 7 has a smaller axial spacing distance between adjacent thread windings or thread paths than is the case in the second, lower axial section 6 opposite the lower end disk 4. The bonded helically extending reinforcing thread 7 serves on the one hand to reinforce and stabilize the filter paper or nonwoven filter web over the entire axial length of the filter medium 2, i.e., over both the first section 5 and the second section 6, so that the filter folds are further stabilized in both circumferential and axial direction. At the same time, the distance between adjacent thread windings in the two sections 5 and 6 is large enough that the flow resistance for the fluid to be filtered is not, or not significantly, increased. Due to the tighter winding in the first upper section 5, the filter medium in this section has even greater stability, however, than in the lower second section 6, without significantly limiting filter performance. The more densely spaced thread windings form a grip protection, which is intended to prevent the filter paper or filter nonwoven from being damaged, particularly radially collapsed, or the filter folds from being displaced in circumferential direction when the filter element is grasped in the area of the upper section 5. In addition, the tighter winding in the upper section 5 also has a soil repellent function when the filter element is grasped.

The reinforcing thread 7 is preferably continuous and extends over both axial sections 5 and 6. It can be advantageous, however, to provide two separate reinforcing threads, each extending over one section 5 or 6. Instead of providing a helical winding, it is also possible to place a plurality of individual reinforcing threads around the outside of the filter medium in circular paths arranged parallel to each other.

In another alternative embodiment, the reinforcing thread is wound helically such that the axial spacing distance increases from one winding to the next.

Figure 2:
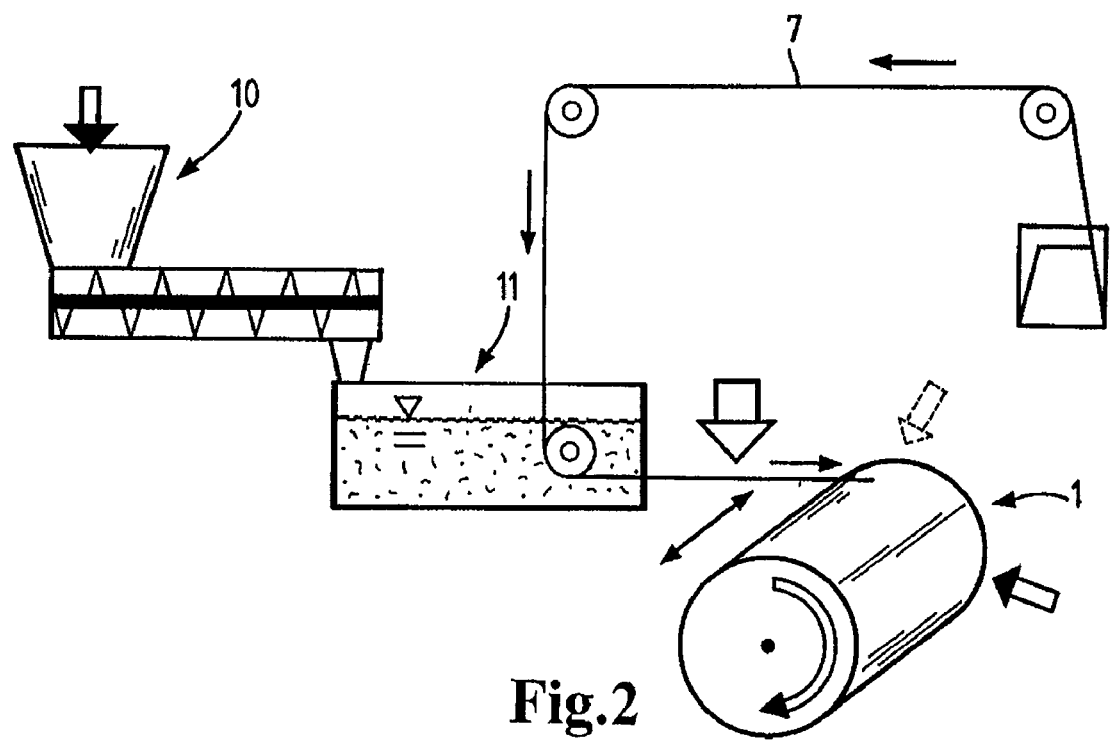
FIG. 2 is a schematic representation of an installation for applying the reinforcing thread to the outside of the filter medium.

FIG. 2 illustrates an installation for applying and bonding the reinforcing threads to the outside of the filter element 1. In a first station 10 of the unit, the bonding agent is delivered as a hot-melt granulate through a hopper and is heated. In a second station 11 of the unit, which comprises three heating zones, the liquefied bonding agent is applied to the reinforcing thread 7 in a bath while the thread is guided through the bath and is subsequently applied helically to the outside of the filter element 1 as the filter element 1 rotates about its longitudinal axis. At the same time, either the filter element 1 is axially displaced to achieve the helical winding of the reinforcing thread on the outside of the filter medium or the thread is axially displaced while circling around the stationary filter element 1. The reinforcing thread 7 wetted with liquid adhesive and guided out of the bath in the second station 11 is exposed to a hot air atmosphere. Compressed air may optionally be applied to the outside of the filter element to ensure that the reinforcing thread conforms securely to the outside of the filter medium.

The foregoing description and examples have been set forth merely to illustrate the invention and are not intended to be limiting. Since modifications of the described embodiments incorporating the spirit and substance of the invention may occur to persons skilled in the art, the invention should be construed broadly to include all variations within the scope of the appended claims and equivalents thereof.

What is claimed is:

1. A filter element for cleaning a fluid, having
a pleated filter medium designed for radial flow and
having a reinforcing thread disposed circumferentially on the outside of the filter medium,
wherein at least two axial sections are provided on the outside of the filter medium,
in which the reinforcing thread is applied to the outside in a plurality of axially spaced circumferential thread windings,
wherein directly adjacent thread windings in one axial section are spaced apart an axial distance which differs from the axial spacing of adjacent thread windings in the other axial section,
the axial spacing in both sections being selected to prevent significantly increasing a flow resistance therethrough,
wherein the axial section with the smaller spacing between adjacent thread windings extends over a shorter axial length than the other axial section with the larger spacing between adjacent thread windings,
wherein the reinforcing thread follows a helically extending path around the outside of the filter medium and has a different thread pitch in the two axial sections,
wherein said reinforcing thread is not a woven net or sheet,
wherein a first portion of said reinforcing thread following said helically extending path does not overlap or contact another portion of said thread on an adjacent portion of said helically extending path, and
wherein the axial spacing of adjacent thread windings differs in the two axial sections by a factor of 1.5 to 10.

2. A filter element as claimed in claim 1, wherein a single continuous reinforcing thread is provided, which extends across both axial sections.

3. A filter element as claimed in claim 1, wherein a plurality of individual reinforcing threads is provided.

4. A filter element as claimed in claim 3, wherein the reinforcing threads are arranged parallel to each other.

5. A filter element as claimed in claim 1, wherein the spacing in the two axial sections differs by a factor of 3.

6. A filter element as claimed in claim 1, wherein the spacing in the first axial section is from 3 to 15 mm.

7. A filter element as claimed in claim 6, wherein the spacing in the first axial section is about 8 mm.

8. A filter element as claimed in claim 1, wherein the spacing in the second axial section is from 10 to 60 mm.

9. A filter element as claimed in claim 8, wherein the spacing in the second axial section is about 25 mm.

10. A filter element as claimed in claim 1, wherein the spacing between adjacent thread windings within each section is constant.

11. A filter element as claimed in claim 1, wherein the spacing between adjacent thread windings increases from section to section.

12. A filter element as claimed in claim 1, wherein the reinforcing thread is adhesively bonded to a plurality of out portions of the filter medium.

13. A filter element as claimed in claim 12, wherein the outer portions comprise peaks of the filter medium.

\* \* \* \* \*